Aug. 8, 1939.  A. R. SPICACCI  2,168,499
ANTIFRICTION BEARING
Filed May 5, 1936

INVENTOR:
ATTILIO R. SPICACCI,
BY
Gales P. Moore
HIS ATTORNEY.

Patented Aug. 8, 1939

2,168,499

UNITED STATES PATENT OFFICE 2,168,499

ANTIFRICTION BEARING

Attilio R. Spicacci, Bristol, Conn., assignor to General Motors Corporation, Detroit, Mich., a corporation of Delaware Application May 5, 1936, Serial No. 77,998

12 Claims. (Cl. 308—236)

This invention relates to antifriction bearings and comprises all of the features of novelty herein disclosed. An object of the invention is to provide improved means for connecting a bearing race ring to a shaft or the like. Another object is to provide a cam or wedging member which will produce an exceedingly forcible gripping action between a race ring and a supporting member. Another object is to provide a race ring securing device which is simple in construction and adaptable to race rings of thick or thin cross section.

To these ends and also to improve generally upon devices of this character the invention consists in the various matters hereinafter described and claimed. In its broader aspects, the invention is not necessarily limited to the specific construction selected for illustrative purposes in the accompanying drawing in which Fig. 1 is an axial sectional view, the supporting shaft being omitted.

Figure 1:
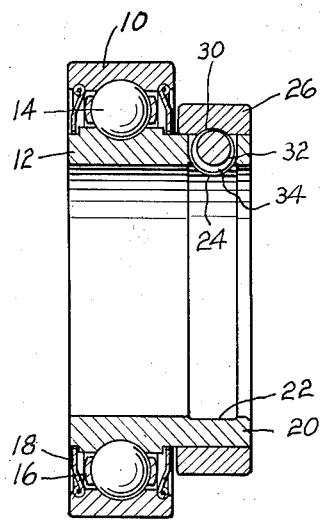

The numeral 10 indicates an outer race ring of an antifriction bearing having an inner race ring 12 and rolling elements 14. The rolling elements are herein shown as balls spaced apart by a separator 16, and the ends of the bearing are closed by suitable shields 18. The foregoing is only illustrative of a suitable bearing or other ring-like member to which the invention may be applied.

The inner race ring 12 has an extension 20 projecting laterally from one end. This extension has an internal groove 22 to provide grinding clearance for a transverse opening which is parallel to a tangent and breaks through to the bore and forms a recess interrupting a portion of the bore between a pair of outwardly facing half round surfaces 24. In the case of small bearings or when the extension 20 is otherwise rather thin in section, a reinforcing ring or collar 26 is sleeved on the extension and, for most purposes, may be regarded as a part of the extension. If such a collar is used, an opening is cut through it substantially tangentially of the inner surface or closely adjacent to and parallel to such a tangent. This results in two separated openings 28 through the collar with an outer surface 30 which is continuous across the ring.

Figures 2, 3:
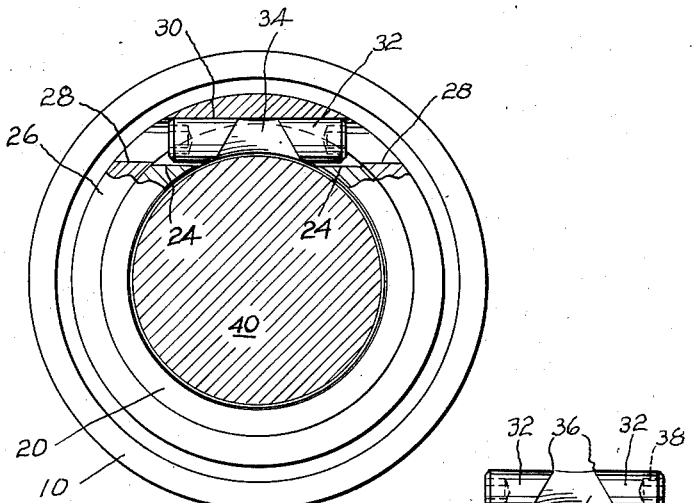
Fig. 2 is an end view of Fig. 1 with a portion in section.
Fig. 3 is a side elevation of the locking pin.
Figure 6:
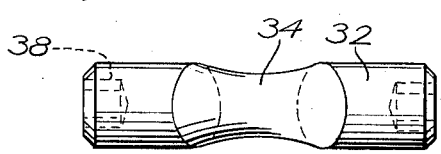
Fig. 6 is a side elevation of the locking pin enlarged and turned to a different position from that shown in Fig. 3.

A waisted locking cam or pin is rotatably mounted in the opening, the circular end portions 32 of the pin bearing against the outer surface 30 and having a small clearance with the surfaces 24 which are preferably of slightly larger radius than that of the openings 28. This clearance and a chamfer at each end of the pin facilitate assembly. The pin has a central cam or waisted portion 34 which is eccentric with respect to the end portions 32 although fully round at any cross section between the points 36. The waisted portion may also be defined as a concave surface of revolution intersecting the circular end portions and having its axis slightly eccentric to the axis of the end portions. The ends of the pin have sockets 38 to provide for turning the pin with a wrench. Figs. 1 and 2 show the locking pin in its free or non-locking position in which position the bearing unit may be slid axially onto a shaft 40. The wide side of the waisted portion 34 and the bore of the ring then have a clearance of a few thousandths of an inch with the shaft for easy assembly. The pin is then turned a few degrees to bring a narrower part of the waisted portion into solid contact with the shaft the reaction being taken by the end portions 32 bearing against the surface 30. Fig. 6 shows the pin turned 90° from the Fig. 3 position and illustrates how the waisted portion 34 approaches the shaft. The eccentricity of the pin is small so that a powerful cam action is produced to force the shaft tightly against the bore of the race ring at the side opposite the locking pin.

Figure 4:
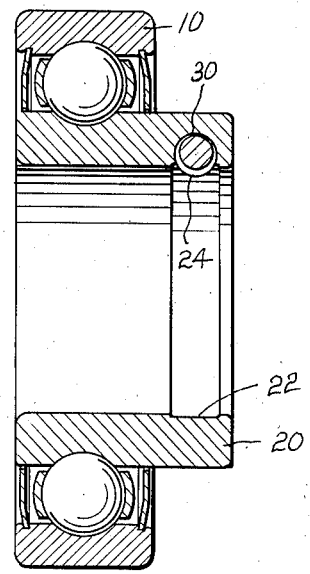
Fig. 4 is an axial sectional view of a modification.
Figure 5:
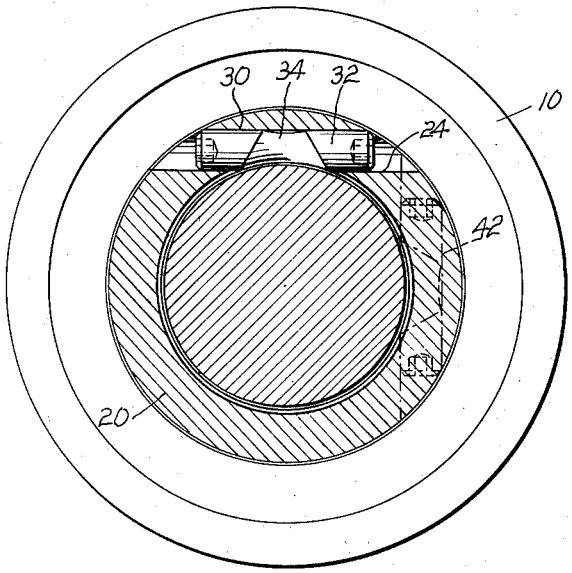
Fig. 5 is a cross sectional view of Fig. 4.

Figs. 4 and 5 show a larger bearing than Figs. 1 and 2, the extension 20 being of sufficient thickness to dispense with a reinforcing collar. Thus the outer surface 30 which bears against the end portions of the locking pin is on the integral extension of the race ring and is concentric with the surfaces 24. If desired, an additional locking pin 42 may be utilized as indicated by broken lines in Fig. 5, this pin preferably being placed about 90° from the other so that both will force the shaft against the bore of the race ring. Figs. 1 and 2 may also have an additional locking pin similarly arranged.

I claim:

1. In an antifriction bearing, a race ring adapted for connection to a supporting member, the race ring having a round opening extending transversely thereof and breaking through to the bore, and a locking member having a round end journalled in the opening and having a cam where the bore is interrupted to bind against the supporting member; substantially as described.

2. In an antifriction bearing, a race ring adapted for connection to a supporting member, the race ring having an opening extending transversely thereof and breaking through to the bore, a locking pin journalled in the opening, and the pin having a waisted portion extending around it and formed eccentric to the journalled portion; substantially as described.

3. In an antifriction bearing, a race ring adapted for connection to a supporting member, the race ring having an extension projecting laterally therefrom, and a locking pin extending crosswise of the extension and having a cam portion breaking through the bore to engage the supporting member; substantially as described.

4. In an antifriction bearing, a race ring adapted for connection to a supporting member, the race ring having an extension projecting laterally therefrom, the extension including a reinforcing collar, and a locking cam reacting between the extension and the supporting member; substantially as described.

5. In an antifriction bearing, a race ring adapted for connection to a supporting member, the race ring having an extension projecting laterally therefrom, the extension including a reinforcing collar, a cross pin interlocking with the collar and the extension and having an intermediate cam portion, and means for turning the pin to hold all of said parts on the supporting member; substantially as described.

6. In an antifriction bearing, a race ring adapted for connection to a supporting member, the race ring having an extension projecting laterally therefrom, the extension including a reinforcing collar, the extension having an opening extending crosswise thereof and breaking through to the bore and to the collar, and a wedging member reacting against the collar and engaging the supporting member at the opening; substantially as described.

7. In an antifriction bearing, a race ring adapted for connection to a supporting member, the race ring having an extension projecting laterally therefrom, the extension including a reinforcing collar, the extension having a transverse opening breaking through to the bore, the collar having a bearing surface opposed to the opening, and a locking pin rotatably engaging the bearing surface and having a cam surface to engage the supporting member; substantially as described.

8. In an antifriction bearing, a race ring adapted for connection to a supporting member, the race ring having a pair of transverse openings breaking through to the bore and to the outside of the ring, and a locking member in each opening and having a cam portion to engage the supporting member; substantially as described.

9. In a device of the character described, a ring adapted for connection to a supporting member, the ring having a portion of its bore interrupted by a recess extending transversely in the plane of the ring, a transversely arranged locking pin in the recess and having a round end portion journalled in the ring, another portion of the ring being of round cross section and eccentric to the end portion, said eccentric portion being concave lengthwise of the pin to conform substantially to the periphery of the supporting member; substantially as described.

10. In a device of the character described, a ring adapted for connection to a shaft, the ring having a hole extending transversely of its bore and breaking through to the bore, a locking pin journalled in the hole for turning movement with respect to the ring, the pin having a portion of round cross section eccentric to its journalled portion and arranged to bind against the shaft, said eccentric portion being concave lengthwise of the pin and of smaller cross section than the hole and the journalled part of the pin; substantially as described.

11. In a device of the character described, a ring adapted for connection to a shaft, the ring having a portion of its bore interrupted by a recess, a locking pin having its end portions round and journalled for turning movement with respect to the ring, the pin having a central portion formed as a concave surface of revolution eccentric to the round end portions and intersecting them, the eccentric portion being located in the recess to bind against the shaft; substantially as described.

12. In a device of the character described, a ring adapted for connection to a shaft, the ring having a transverse opening which is round and breaks through the bore to the shaft, a locking pin journalled at its ends in the opening and having a central cam portion eccentric to its ends, said central portion being waisted and concave lengthwise of the pin to conform substantially to the periphery of the shaft, and means for turning the pin to force the cam portion against the shaft; substantially as described.

ATTILIO R. SPICACCI.